United States Patent [19]

Hargreaves et al.

[11] 4,381,319

[45] Apr. 26, 1983

[54] METHOD OF BONDING ROTATING BANDS ON PROJECTILES

[75] Inventors: Charles R. Hargreaves, Maple Plain; Stephen J. Price, Crystal, both of Minn.

[73] Assignee: Honeywell Inc., Minneapolis, Minn.

[21] Appl. No.: 336,232

[22] Filed: Dec. 31, 1981

Related U.S. Application Data

[63] Continuation-in-part of Ser. No. 193,680, Oct. 3, 1980, abandoned.

[51] Int. Cl.³ .............................................. B05D 1/10
[52] U.S. Cl. .................................... 427/34; 29/527.3; 102/527; 156/244.23; 156/245
[58] Field of Search ................... 427/34, 423; 29/458, 29/527.1, 527.2, 527.3, 527.4, 1.2, 1.21, 1.22, 1.23; 156/242, 244.23, 245; 264/135, 512, 516; 102/92.1, 93

[56] References Cited

U.S. PATENT DOCUMENTS

| 3,910,194 | 10/1975 | Dehm et al. | 102/93 |
| 3,942,230 | 3/1976 | Nalband | 427/34 |
| 4,196,256 | 4/1980 | Eddy et al. | 427/34 |

Primary Examiner—John H. Newsome
Attorney, Agent, or Firm—Roger W. Jensen

[57] ABSTRACT

A method of bonding a thermoplastic rotating band onto a projectile including the steps of designating, e.g., machining, a band seat zone onto a metallic, e.g., steel, projectile body, coating the band seat zone with a sprayed metallic coating, and applying a polymer in liquid form around said zone and to said sprayed metallic coating to form a plastic rotating band.

17 Claims, 5 Drawing Figures

APPARATUS OF EITHER FIG.2 OR FIG.3 PLUS MOLDING OF POLYMER TO FORM HOMOGENEOUS PLASTIC ROTATING BAND

BAND SEAT ZONE DESIGNATED, e.g. MACHINED, AND CLEANED

COATING ZONE WITH PLASMA FLAME SPRAYED METALLIC COATING

POLYMER PRIMER COAT APPLIED OVER METALLIC COATING

APPARATUS OF EITHER FIG. 2 OR FIG. 3 PLUS MOLDING OF POLYMER TO FORM HOMOGENEOUS PLASTIC ROTATING BAND

METHOD OF BONDING ROTATING BANDS ON PROJECTILES

BACKGROUND OF THE INVENTION

This application is a continuation-in-part of our prior application Ser. No. 193,680, Filed Oct. 3, 1980, entitled "Method of Bonding Rotating Bands On Projectiles" now abandoned.

This invention relates to a method of bonding a thermoplastic rotating band to a metallic projectile body.

Rifled barrels of course, are extremely old in the art of firing projectiles; the significance of the rifled barrel being, as the projectile is pushed down the barrel of the gun under the propelling forces of the expanding gases of the burning propellant, gun powder, or the like, that the rifling in the barrel imparts a spin to the projectile which spin is retained after the projectile emerges from the muzzle of the barrel. The spin imparted to the projectile results in a much greater range i.e., distance traveled, and also greatly increases the accuracy in the flight of the projectile.

In the early days the typical arrangement was to have a hard gun barrel, e.g., steel with a rifled bore and a relatively soft projectile, e.g., lead, with the diameter of the lead projectile being selected so as to cause an engagement between the projectile and the rifling grooves in the barrel bore so as to impart the desired spin to the projectile.

The use of steel projectile bodies initiated the development of various schemes for providing a separate rotating ring or band for the projectile; this was necessitated because a steel-on-steel arrangement would rapidly destroy a gun barrel. It is old, for example, to use a copper metal rotating ring bonded to a steel projectile body. This arrangement is not fully satisfactory, especially in the body of very high velocity projectiles. It has been determined that copper rotating rings fail at velocities above four-thousand feet per second due to the melting of the copper; such melting causes the expected ballistic travel of the projectile to be adversely affected. Also severe barrel wear occurs, i.e. a plating of copper tends to collect on the inside of the barrel, thus eventually and rapidly destroying its effectiveness.

Soft iron bands have been tried for high velocity applications; they have been found to function on a short term basis but, when used in high firing rate systems, barrel wear is excessive and unacceptable.

Because of the problems associated with copper rotating bands and soft iron rotating bands, considerable research has been done in recent years to the utilization of plastic material for a projectile rotating band; a pertinent example of such prior art is the apparatus disclosed in U.S. Pat. No. 3,910,194 granted Oct. 7, 1975 wherein a plastic rotating band is bonded to a steel projectile body by the use of so-called chemical bonding, i.e., the use of an adhesive to bond the plastic rotating ring to the steel body. In addition to the use of adhesives, other schemes that have been tried for bonding a plastic rotating ring to a metallic, e.g., steel, projectile body; examples of the preceding are the use of mechanical obstructions, e.g, knurling around the periphery of the projectile in the zone of the band seat or having a plurality of radially extending shoulders or rings in the circumferential surface of the projectile body. The use of adhesives for directly bonding a plastic rotating ring to the projectile body has failed dramatically. For example, in the early 1970's a very large quantity of ammunition was manufactured for the United States Government wherein the ammunition comprised a steel projectile body with a sandblasted rotating band seat to which was bonded, by the use of adhesives, a nylon rotating ring. The ammunition in question was delivered to a government facility in the southern part of the United States where high humidity in the air was typical. In less than five years an examination was made of the ammunition in question and it was found that humidity in the air had penetrated through or around the plastic rotating band so as to oxidize, i.e., rust, the surface of the steel projectile body at the junction between the body and the band, totally destroying the adhesive bond between the body and the band so that the plastic rotating ring could be freely spun around the longitudinal axis of the projectile. In other words the projectiles were totally worthless.

All known mechanical retention arrangements, such as those described above for attaching the plastic rotating band onto the metallic projectile body, have also failed; they are as a group unable to handle the tremendous rotational torques which must be transmitted from the rotation ring to the projectile bodies during the extremely rapid acceleration down the gun barrel that occurs in the very high velocity ammunition which is currently required.

The above identified parent application, Ser. No. 193,680, mentioned certain prior art U.S. Pat. Nos. 4,092,387; 4,097,353; 3,352,955; 3,763,298; 4,0075,392; and 3,961,098; none of these references directly address the problem of successfully bonding a plastic rotating band to a metallic projectile body.

SUMMARY OF THE INVENTION

It is thus apparent that there is a critical need for a satisfactory rotating band especially for high velocity projectiles and even more so for steel bodied high velocity projectiles. The present invention meets this need very effectively and economically by providing a thermoplastic rotating band which is mechanically retained to the projectile body, the retention mechanism comprising in part a sprayed metallic coating of the entire band seat zone which provides two functions/advantages. First the sprayed metallic coating is characterized by having a large number of irregularly shaped projections, i.e., a relatively rough external surface, such large number of irregularly shaped projections comprising a maze of mechanical attachments to the projectile body. Secondly, the coating i.e., the sprayed metallic coating is continuous, i.e., is metallurgically continuous so as to cover the entire surface of the projectile in the zone of the band seat and is by definition metallurgically bonded to the projectile body so as to have a metal-to-metal bond strength. In this manner the steel is protected from rusting, i.e., oxidization or corrosion by the sprayed metallic coating or layer which prevents the moisture which may permeate through or around the edges of the plastic ring from reacting with the steel projectile body.

DESCRIPTION OF THE PREFERRED EMBODIMENT

Figure 1:
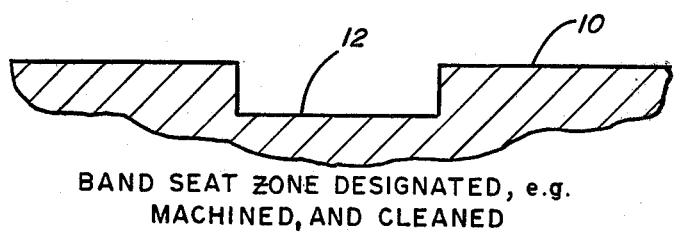
FIG. 1 shows a portion of a metallic projectile body with a band seat zone designated; in this body the band seat zone is designated through the machining of a circumferential groove in the external surface of the cylindrically shaped side wall of the projectile.

Referring to FIG. 1 a projectile body 10 has a band seat zone designated; in this body the band seat zone 12 is designated through the machining of a circumferential groove or band seat in the circumferential face of the projectile body 10. Although a machined grooved or band seat is depicted in this application, it will be understood that the scope of the application includes the bonding of a plastic rotating band to a smooth surface metallic projectile body having no specially machined groove or band seat; this would be especially applicable in the body of a projectile body fashioned out of very high strength but very thin material which would not permit the machining of grooves into the circumferential face of the material.

Figure 2:
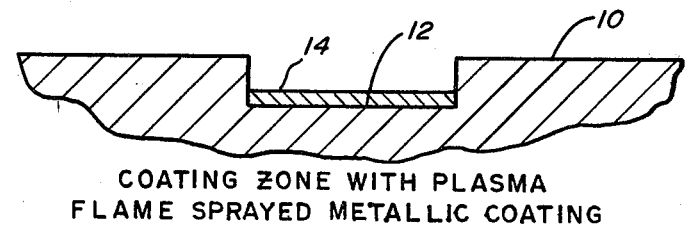
FIG. 2 shows the same portion of the projectile after the band seat zone has been coated with a sprayed metallic coating such as by use of plasma flame spraying apparatus.

After machining the band seat 12 may be cleaned by various means such as grit blasting. In the preferred embodiment, the band seat zone 12 has been grit blasted by conventional apparatus to roughen the substrate steel surface, portions of the external surface of the projectile to either side of the band seat being protected from the blasting process by appropriate masks during the grit blasting step. It will be understood that various arrangements can be used for having the appropriate surface prepared for the application of the plasma flame sprayed metallic coating shown in FIG. 2, the main requirement being to get a very good metallurgical bond between the flame sprayed metallic coating and the metallic projectile body. In FIG. 2 the reference numeral 14 designates the sprayed metallic coating which, as indicated, in the preferred embodiment, is applied through the use of a plasma flame spray arrangement. Prior art teachings of flame spraying processes are U.S. Pat. No. 3,942,230 and British Pat. No. 1,184,561.

The flame spraying process utilizes a so-called plasma flame spraying process. Additionally however, the metallic coating may be applied through the use of the wire type spraying process. A preferred sprayed metal coating is an alloy having a trade name of Metco P-444 and includes chromium, aluminium, molybdenum, iron and nickel. Typically, the projectile is rotating slowly about its longitudinal axis while the metal coating is sprayed onto the band seat in layers of about 0.002 to 0.005 inches until the desired thickness is achieved. The thickness may range from 0.003 inches to more than 0.012 inches but it is preferred that the sprayed metallic coating have a thickness ranging from about 0.005 inches to 0.008 inches.

Figure 3:
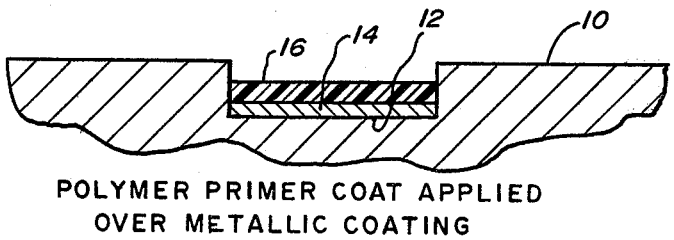
FIG. 3 shows the segment of the projectile body for an optional step of applying a polymer coating over the metallic coating as a step precedent to the molding of additional polymer around said zone which is depicted in FIG. 4.

The next step is optional; it comprises coating the metallic coated band seat with a solution comprising the thermoplastic rotating band polymer dissolved in a solvent, and drying the solution to evaporate the solvent. As shown in FIG. 3, this solution coating 16 is applied directly to the metallic coating 14 in the band seat 12 of the projectile wall 10. The projectiles are vapor degreased to remove handling residue and to insure a contaminant free surface. The clean surface is then impregnated by brushing or spraying on a liquid solution. In a preferred embodiment, the solution is comprised of about 1 part by weight of a rotating band polymer such as polyethersulfone and 3 parts by weight of solvent. The solvent was a mixture by volume of 1 part acetone and 3 parts of 1-methyl-2-pyrolidinone.

The freshly coated band seat coatings are then allowed to dry. Air drying for an hour or more may be then followed by an oven bake to evaporate the carrier solvents. At this point in time, the solvents have evaporated and the remaining polymer has flowed within the porous metal coating.

Figure 4:
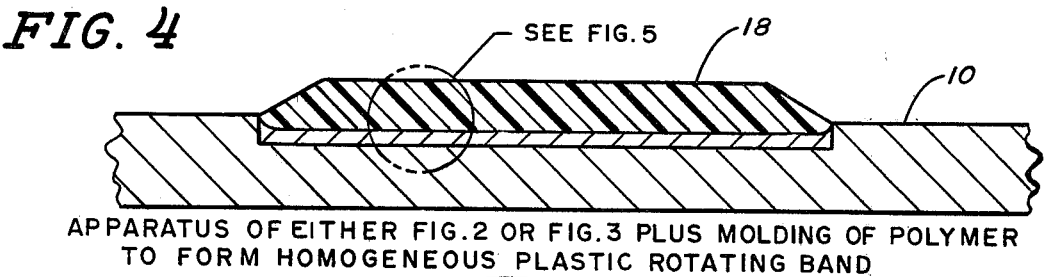

Finally, a thermoplastic rotating band 18 is injection molded onto the polymer coating 16 and metallic coating 14 in the band seat 12 of the projectile 10 as shown in FIG. 4. In the preferred embodiment prior to the molding of the rotating band, each projectile is induction heated to a temperature sufficiently high to melt the remaining polymer coating but not sufficient to thermally degrade said polymer. Preferably, this temperature may range from about 400° F. to about 700° F. and preferably from 575° F. to 625° F. for polyethersulfone and is similarly adjusted to the molding temperature for other polymers. The hot projectile is then placed into a mold and the polymeric rotating band is then molded onto the coated plasma flame sprayed metal coating band seat. After removal from the mold, the projectile is permitted to stand undisturbed for approximately 24 hours to allow relaxation of the normally occurring molding stresses within the polymeric rotating band. If desired, in a preferred embodiment, the rotating band may be annealed at a temperature approximating the heat distortion temperature of the polymeric material for a polyethersulfone rotating band, an annealing cycle of approximately 365° F. to 385° F. may be employed for a period of up to 18 hours to 2 days.

A plurality of projectiles were fitted with plastic rotating bands using the above described process of this invention. These projectiles were stored at various temperatures and humidity conditions which were known to be adverse storage conditions. A number of rounds were then fired at conventional velocities without failures. For example, a 30 millimeter projectile was fired at 4600 feet per second, and several 25 millimeter projectiles were fired at 5200 feet per second and 5300 feet per second with total retention of the rotating band, at temperatures ranging from −65° F. to +165° F., thus demonstrating the successful retention of the plastic to metal.

Figure 5:
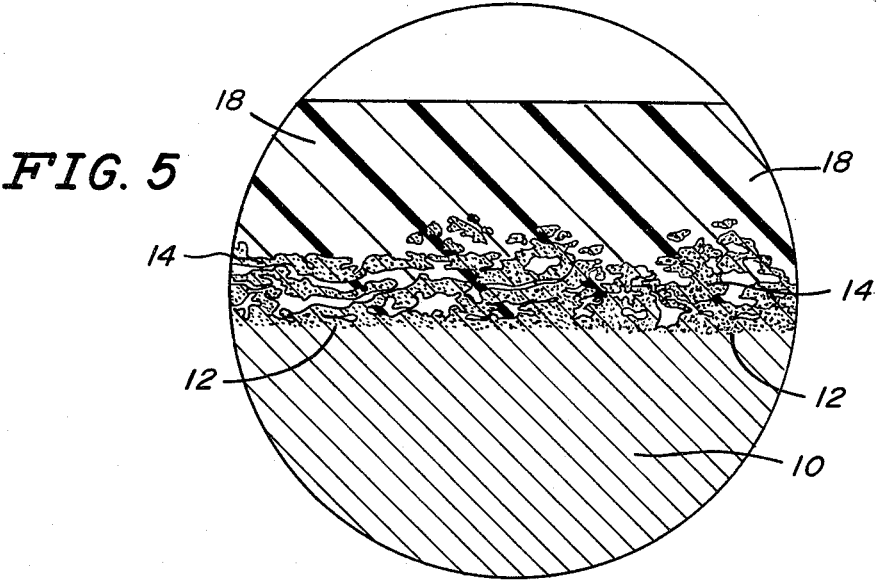
FIG. 5 is a substantial enlargement of a small segment of the apparatus shown in FIG. 4.

As indicated above, the step depicted in FIG. 3 is optional; in some bodies the plastic rotating band may be applied, e.g., molded directly on top of the sprayed metallic coating 14. Thus in FIG. 4, the plastic rotating ring 18 may be considered to have been applied directly to the external surface of the metallic coating 14 depicted in FIG. 2. Alternately the showing in FIG. 4 may be considered to be the plastic rotating ring 18 applied, i.e., molded on top of the solution coating 16 and depicted in FIG. 3. In either body the result is the same, i.e., a homogeneous plastic ring applied in fluid form so as to permeate into intimate contact with the irregularly shaped projections on the sprayed metallic coating so that, after the polymer becomes solid, a very high torque transmittal interface is provided between the plastic rotating band and the projectile body. All of the foregoing is depicted with more understanding in FIG. 5 which shows a cross-section enlargement of the apparatus shown in FIG. 4. FIG. 5 especially depicts how the layer 14, i.e., the plasma flame sprayed metallic coating actually comprises a large number of irregularly shaped projections comprising a maze of mechanical attachments to the projectile body 10; this relatively rough external surface is characterized further by being metallurgically continuous and by being metallurgically bonded to the projectile body so as to have a metal-to-metal bond strength. The large number of irregularly shaped projections comprising a maze of mechanical attachments to the projectile body thus provide an excellent gripping surface or means by which the plastic rotating band may grip the projectile body so as to impart the exceedingly high torques that will be applied thereto as the high velocity projectile is accelerated down the gun barrel under the forces of the firing gases, i.e., the gases produced by the burning propellant. Further, the sprayed metallic coating is continuous so as to cover the entire surface of the band seat zone; this prevents oxidization of the steel substrate notwithstanding prolonged storage of the finished projectiles in warm moist environments.

Because FIG. 5 is a cross-sectional view, some parts of material 14 appear to be independent; such parts are actually connected to the main body 14 through portions extending into or out of the plane of the drawing.

Having thus described the invention, what is claimed is:

1. A method of bonding a thermoplastic rotating band to a metallic projectile body, comprising the steps of:
    designating a band seat zone on a metallic projectile body;
    coating said band seat zone with a sprayed metallic coating, said coating being characterized by (i) having a relatively rough external surface, i.e., a large number of irregularly shaped projections comprising a maze of mechanical attachments to said body, (ii) being about 0.003 inches to 0.012 inches thick so as to be metallurgically continuous, thereby to prevent oxidation of said body at said band seat zone thereof, and (iii) being metallurgically bonded to said projectile body so as to have a metal-to-metal bond strength; and
    applying a thermoplastic polymer in liquid form around said zone and to said sprayed metallic coating to form, after hardening, a thermoplastic rotating band, said polymer, while in fluid form, permeating into intimate contact with said irregularly shaped projections so that, after said polymer becomes solid, a high torque transmittal interface is provided between said plastic rotating band and said projectile body.

2. The method of claim 1 wherein said applying a polymer around said zone comprises the sequential steps of;
    (a) coating said sprayed metallic coating with a solution comprising said thermoplastic polymer dissolved in a solvent, i.e., a low viscosity solution, so as to impregnate dissolved polymer on and around said irregularly shaped projections,
    (b) evaporating said solvent thus leaving residual thermoplastic polymer on and around said irregularly shaped projections, and
    (c) molding additional thermoplastic polymer around said zone and over said residual polymer so that said additional polymer melds with said residual polymer to form a homogeneous thermoplastic rotating band in intimate engagement with said irregularly shaped projections to thus provide, in function, a retention mechanism between said rotating band and said body, i.e., a high torque transmittal interface.

3. The method of claim 1 wherein said applying a polymer around said zone comprises the step of directly molding thermoplastic polymer in liquid form around said sprayed metallic coating, said liquid form polymer impregnating said rough external surface of said sprayed metallic coating so as to engage and envelope said irregularly shaped projections, to thus provide, in function, a very high torque transmittal retention mechanism between said rotating band and said body.

4. The method of claim 2 wherein said sprayed metallic coating is applied using plasma flame spray apparatus and ranges in thickness from 0.003 inches to 0.012 inches.

5. The method of claim 4 wherein said coating thickness ranges from 0.005 inches to 0.008 inches.

6. The method of claim 2 wherein (with respect to subparagraph [a]) the ratio of polymer to solvent ranges from 1:5 to 1:1, by weight.

7. The method of claim 6 wherein said ratio is about 1:3.

8. The method of claim 2 wherein (i) said band seat zone is cleaned prior to coating with said sprayed metallic coating and (ii) said projectile is heated to a temperature sufficient to melt but not thermally degrade said residual polymer prior to said molding step.

9. The method of claim 8 wherein said temperature ranges from about 400° F. to about 700° F.

10. The method of claim 9 wherein said heating is done by induction heating.

11. The method of claim 8 wherein said polymer is polyethersulfone and wherein said temperature ranges from about 575° F. to 625° F.

12. The method of claim 1 wherein said projectile with said rotating band is annealed at a temperature up to 400° F. for up to 2 days.

13. The method of claim 1 wherein said metallic body is steel and said sprayed metallic coating is corrosion resistant and entirely covers the steel surface in said zone to thereby provide corrosion resistance during prolonged periods of storage in high humidity environments.

14. The method of claim 13 wherein the sprayed metallic coating is nickel alloy.

15. The method of claim 3 wherein said sprayed metallic coating is applied using plasma flame spray apparatus and ranges in thickness from 0.003 inches to 0.012 inches.

16. The method of claim 15 wherein said coating thickness ranges from 0.005 inches to 0.008 inches.

17. The method of claim 16 wherein the sprayed metallic coating is nickel alloy.

* * * * *